US012724859B2

(12) United States Patent
Xu et al.

(10) Patent No.: US 12,724,859 B2
(45) Date of Patent: Sep. 1, 2026

(54) WATERMARK PROCESSING

(71) Applicants: Beijing Youzhuju Network Technology Co., Ltd., Pinggu District (CN); Lemon Inc., Grand Cayman (KY)

(72) Inventors: Xiaojun Xu, Los Angeles, CA (US); Jinghan Jia, Los Angeles, CA (US); Hang Li, Beijing (CN); Yuanshun Yao, Los Angeles, CA (US)

( * ) Notice: Subject to any disclaimer, the term of this patent is extended or adjusted under 35 U.S.C. 154(b) by 103 days.

(21) Appl. No.: 18/957,333

(22) Filed: Nov. 22, 2024

(65) Prior Publication Data

US 2025/0086257 A1 Mar. 13, 2025

(51) Int. Cl.

*G06F 21/00* (2013.01)
*G06F 21/16* (2013.01)
*G06F 40/289* (2020.01)

(52) U.S. Cl.

CPC ............ *G06F 21/16* (2013.01); *G06F 40/289* (2020.01)

(58) Field of Classification Search

CPC ........ G06F 21/16; G06F 40/289; G06F 40/30; G06F 40/56

See application file for complete search history.

(56) References Cited

U.S. PATENT DOCUMENTS 12,561,688 B1 * 2/2026 Roussel ............. G06Q 20/4016
2024/0193913 A1 * 6/2024 Saraee ................ G06F 16/9535
2024/0212315 A1 * 6/2024 Saraee ................... G06N 3/045
2024/0281775 A1 * 8/2024 Jayaraman ........... G06V 30/153
2024/0281944 A1 * 8/2024 Jayaraman ............ G06T 7/0002
2024/0282092 A1 * 8/2024 Jayaraman ............. G06V 10/82
2024/0338935 A1 * 10/2024 Pedone .................. G06V 10/20
2024/0378856 A1 * 11/2024 Saraee ................... G06N 3/045
2025/0014314 A1 * 1/2025 Hamedi ................ G06F 16/438
2025/0030438 A1 * 1/2025 Cooper ............... H03M 7/4056
2025/0037422 A1 * 1/2025 Saraee .................. G06F 16/951
2025/0078453 A1 * 3/2025 Saraee ................... G06V 10/40
2025/0078454 A1 * 3/2025 Saraee ................. G06V 10/761
2025/0104392 A1 * 3/2025 Saraee ................... G06V 10/40
2025/0139858 A1 * 5/2025 Hoffer ................... G06F 3/0483
2025/0307974 A1 * 10/2025 Agarwal ................. G06T 11/60
2026/0006142 A1 * 1/2026 Filler .................... G06T 1/0064
2026/0039902 A1 * 2/2026 Witonsky ................ G10L 15/10

* cited by examiner

*Primary Examiner* — Mahfuzur Rahman
(74) *Attorney, Agent, or Firm* — Alleman Hall LLP

(57) ABSTRACT

Embodiments of the present disclosure provide a solution for watermark processing. A method includes: dividing at least one portion of a n original text for watermark embedding into a plurality of original text segments; determining, for an original text segment of the plurality of original text segments, a target symbol from a symbol sequence in watermark information; converting, based on respective target symbols determined for the plurality of original text segments, the plurality of original text segments into a plurality of watermarked text segments by using a set of language models for watermark embedding, the set of language models corresponding to a set of symbol values respectively; and generating a watermarked text for the original text based on the plurality of watermarked text segments.

18 Claims, 6 Drawing Sheets

Algorithm 1 Encoding algorithm.

Input: Input text $x^o$; Watermark message $M$; Text segmentor $S$; Parameters for two paraphrasers $\theta_0$ and $\theta_1$.

Output: Watermarked text $x^w$

1: $x^w \leftarrow [\,]$
2: $i \leftarrow 0$ `/* index of current watermark bit */`
3: while $x^w[-1] \neq \langle \text{EOS} \rangle$ do
4: $bit \leftarrow M[i]$ — 305
5: $x^w$.append($f(x^o, x^w; \theta_{bit})$) — 310
6: `/* Switch to next bit if current segmentation ends. */`
7: if $S(x^w;$ mode$=E) = 1$ then
8: $i \leftarrow i + 1$
9: end if
10: end while
11: return $x^w$

*FIG. 3*

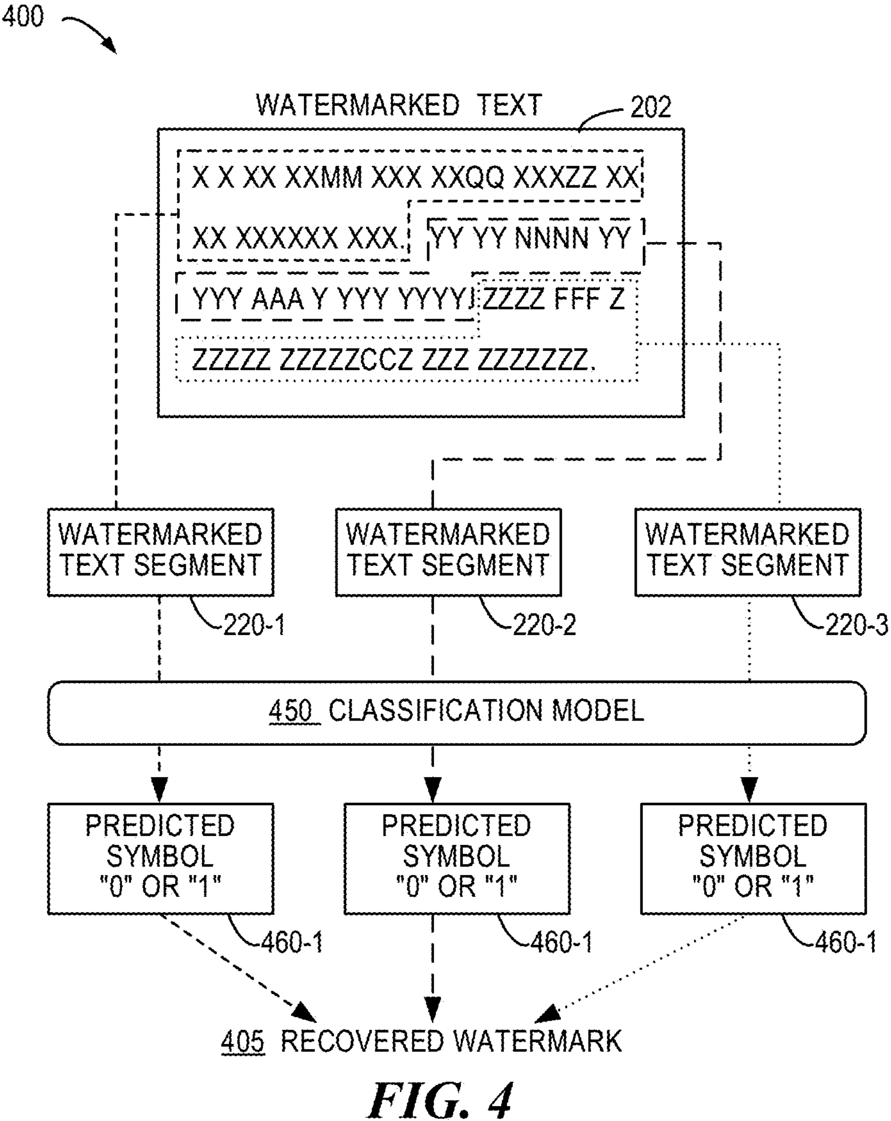

*FIG. 4*

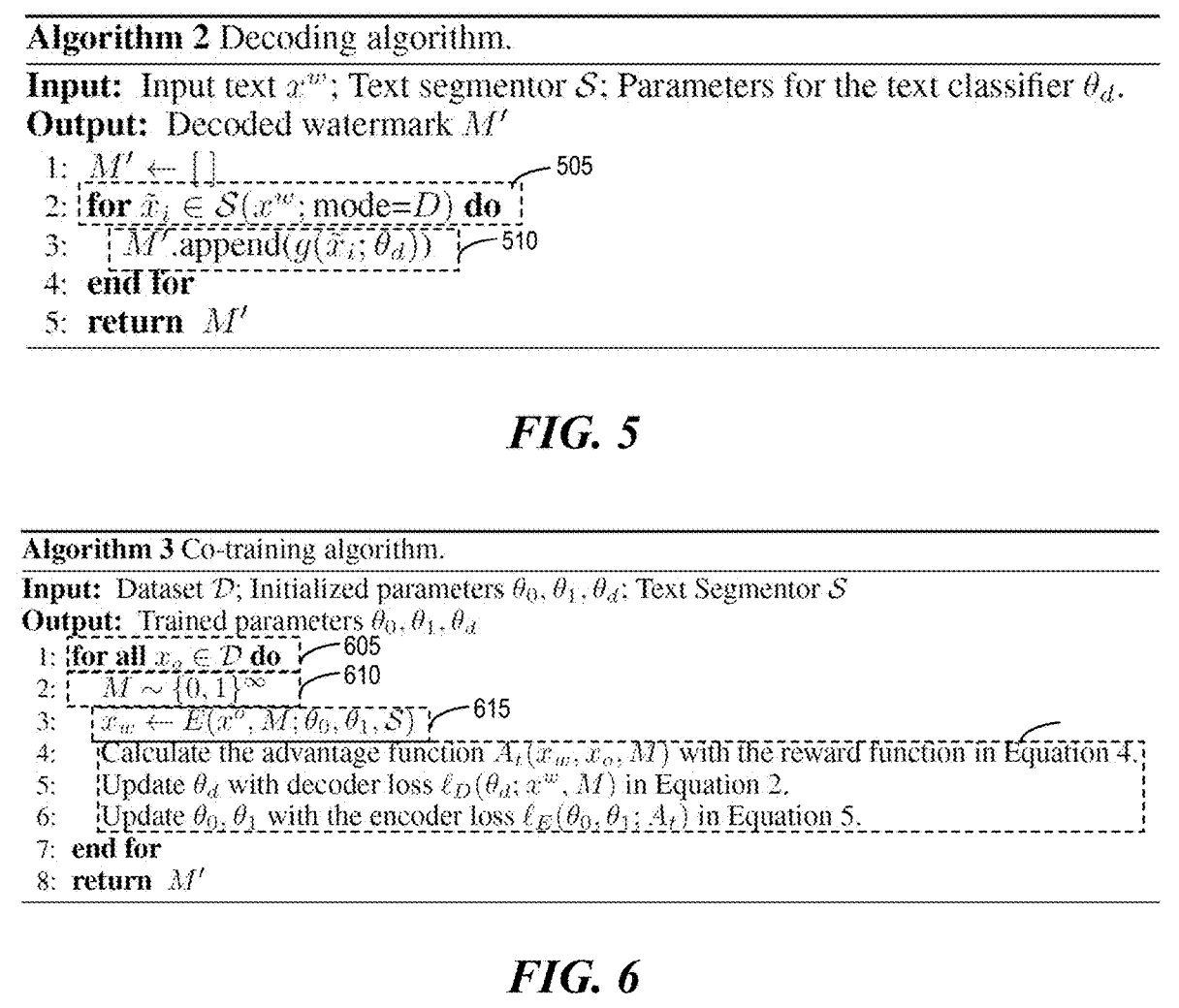

Algorithm 2 Decoding algorithm.

Input: Input text $x^w$; Text segmentor $\mathcal{S}$; Parameters for the text classifier $\theta_d$.
Output: Decoded watermark $M'$ 1: $M' \leftarrow [\,]$
2: for $\tilde{x}_i \in \mathcal{S}(x^w;\text{mode}=D)$ do 505
3: $M'$.append($g(\tilde{x}_i;\theta_d)$) 510
4: end for
5: return $M'$

*FIG. 5*

Algorithm 3 Co-training algorithm.

Input: Dataset $\mathcal{D}$; Initialized parameters $\theta_0, \theta_1, \theta_d$; Text Segmentor $\mathcal{S}$
Output: Trained parameters $\theta_0, \theta_1, \theta_d$ 1: for all $x_o \in \mathcal{D}$ do 605
2: $M \sim \{0,1\}^\infty$ 610
3: $x_w \leftarrow E(x^o, M; \theta_0, \theta_1, \mathcal{S})$ 615
4: Calculate the advantage function $A_t(x_w, x_o, M)$ with the reward function in Equation 4.
5: Update $\theta_d$ with decoder loss $\ell_D(\theta_d; x^w, M)$ in Equation 2.
6: Update $\theta_0, \theta_1$ with the encoder loss $\ell_E(\theta_0, \theta_1; A_t)$ in Equation 5.
7: end for
8: return $M'$

*FIG. 6*

WATERMARK PROCESSING

FIELD

The present disclosure generally relates to computer technologies, and more specifically, to a method, apparatus, device and computer readable storage medium for watermark processing.

BACKGROUND

With the development and application of language models (LMs), the protection of textual content copyright and the tracing of information have become increasingly important. Text watermarks may be used for various applications, including copyright protection and hidden message communication. In the realm of copyright protection, ensuring the originality of textual works and preventing unauthorized use are critical. Additionally, there is a growing need to track misinformation spread by LMs, which can be addressed by using text watermarks injected into model outputs. Therefore, tracking and identifying content generated or modified by LMs has also become an urgent problem that needs to be addressed.

SUMMARY

In a first aspect of the present disclosure, there is provided a method of watermark processing. The method comprises: dividing at least one portion of a n original text for watermark embedding into a plurality of original text segments; determining, for an original text segment of the plurality of original text segments, a target symbol from a symbol sequence in watermark information; converting, based on respective target symbols determined for the plurality of original text segments, the plurality of original text segments into a plurality of watermarked text segments by using a set of language models for watermark embedding, the set of language models corresponding to a set of symbol values respectively; and generating a watermarked text for the original text based on the plurality of watermarked text segments.

In a second aspect of the present disclosure, there is provided an apparatus for watermark processing. The apparatus comprises: an original text dividing module configured to divide at least one portion of a n original text for watermark embedding into a plurality of original text segments; a target symbol determining module configured to determine, for an original text segment of the plurality of original text segments, a target symbol from a symbol sequence in watermark information; a watermarked text segment converting module configured to convert, based on respective target symbols determined for the plurality of original text segments, the plurality of original text segments into a plurality of watermarked text segments by using a set of language models for watermark embedding, the set of language models corresponding to a set of symbol values respectively; and a watermarked text generating module configured to generate a watermarked text for the original text based on the plurality of watermarked text segments.

In a third aspect of the present disclosure, there is provided an electronic device. The electronic device comprises: at least one processing unit; and at least one memory coupled to the at least one processing unit and storing instructions executable by the at least one processing unit, the instructions, upon execution by the at least one processing unit, causing the electronic device to perform: dividing at least one portion of a n original text for watermark embedding into a plurality of original text segments; determining, for an original text segment of the plurality of original text segments, a target symbol from a symbol sequence in watermark information; converting, based on respective target symbols determined for the plurality of original text segments, the plurality of original text segments into a plurality of watermarked text segments by using a set of language models for watermark embedding, the set of language models corresponding to a set of symbol values respectively; and generating a watermarked text for the original text based on the plurality of watermarked text segments.

In a fourth aspect of the present disclosure, a computer-readable storage medium is provided. The computer-readable storage medium stores computer executable instructions which, when executed by an electronic device, causes the electronic device perform operations comprising: dividing at least one portion of a n original text for watermark embedding into a plurality of original text segments; determining, for an original text segment of the plurality of original text segments, a target symbol from a symbol sequence in watermark information; converting, based on respective target symbols determined for the plurality of original text segments, the plurality of original text segments into a plurality of watermarked text segments by using a set of language models for watermark embedding, the set of language models corresponding to a set of symbol values respectively; and generating a watermarked text for the original text based on the plurality of watermarked text segments.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The above and other features, advantages and aspects of the embodiments of the present disclosure will become more apparent in combination with the accompanying drawings and with reference to the following detailed description. In the drawings, the same or similar reference symbols refer to the same or similar elements, where:

FIG. 3 illustrates a schematic diagram of an algorithm 1 for encoding in accordance with some embodiments of the present disclosure;

FIG. 4 illustrates a decoding process for watermark processing in accordance with some embodiments of the present disclosure;

FIG. 5 illustrates a schematic diagram of an algorithm 2 for decoding in accordance with some embodiments of the present disclosure;

FIG. 6 illustrates a schematic diagram of an algorithm 3 for training the set of language models 250 in accordance with some embodiments of the present disclosure;

DETAILED DESCRIPTION

Figure 1:
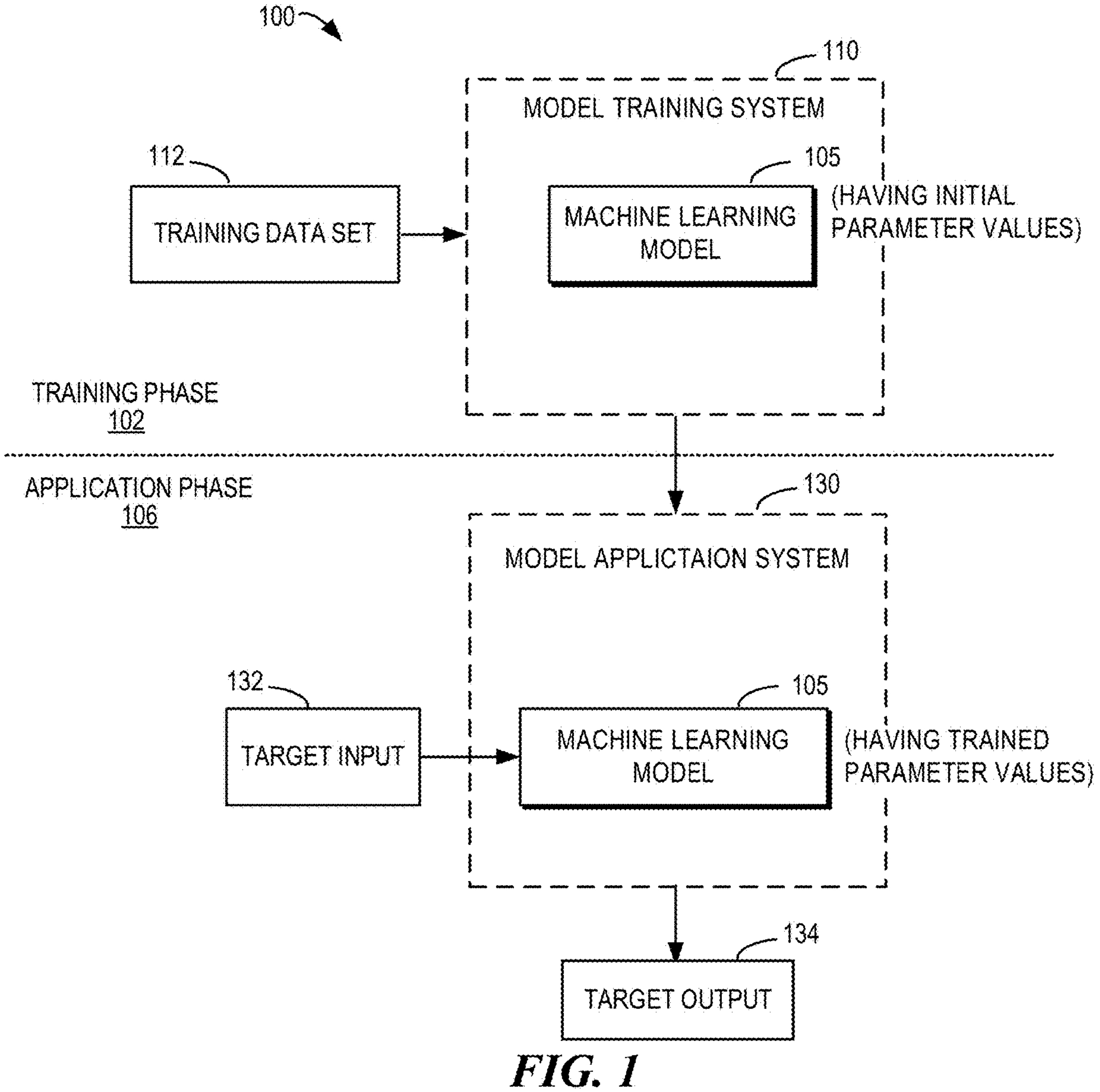
FIG. 1 illustrates a schematic diagram of an example environment in which embodiments of the present disclosure may be implemented.

The embodiments of the present disclosure will be described in more detail below with reference to the accompanying drawings. Although some embodiments of the present disclosure are shown in the drawings, it would be appreciated that the present disclosure may be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for the purpose of illustration and are not intended to limit the scope of protection of the present disclosure.

In the description of the embodiments of the present disclosure, the term "including" and similar terms would be appreciated as open inclusion, that is, "including but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below. As used herein, the term "model" can represent the matching degree between various data. For example, the above matching degree can be obtained based on various technical solutions currently available and/or to be developed in the future.

It will be appreciated that the data involved in this technical proposal (including but not limited to the data itself, data acquisition or use) shall comply with the requirements of corresponding laws, regulations and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, and the user's authorization should be obtained.

For example, in response to receiving an active request from a user, a prompt message is sent to the user to explicitly prompt the user that the operation requested operation by the user will need to obtain and use the user's personal information. Thus, users may select whether to provide personal information to the software or the hardware such as an electronic device, an application, a server or a storage medium that perform the operation of the technical solution of the present disclosure according to the prompt information.

As an optional but non-restrictive implementation, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

As used herein, the term "model" can learn a correlation between respective inputs and outputs from training data, so that a corresponding output can be generated for a given input after training is completed. The generation of the model can be based on machine learning techniques. Deep learning is a machine learning algorithm that processes inputs and provides corresponding outputs by using multiple layers of processing units. A neural networks model is an example of a deep learning-based model. As used herein, "model" may also be referred to as "machine learning model", "learning model", "machine learning network", or "learning network", and these terms are used interchangeably herein.

"Neural networks" are a type of machine learning network based on deep learning. Neural networks are capable of processing inputs and providing corresponding outputs, typically comprising input and output layers and one or more hidden layers between the input and output layers. Neural networks used in deep learning applications typically comprise many hidden layers, thereby increasing the depth of the network. The layers of neural networks are sequentially connected so that the output of the previous layer is provided as input to the latter layer, where the input layer receives the input of the neural network and the output of the output layer serves as the final output of the neural network. Each layer of a neural network comprises one or more nodes (also known as processing nodes or neurons), each of which processes input from the previous layer.

As used herein, the term "watermark information" may refer to one or more watermarks of any suitable types. The watermark information may include a symbol sequence comprising a plurality of symbols. The symbol may refer to any suitable information unit, for example, a letter, a character, a bit, etc. An example of symbol sequence may be a bit string. In such an example, the symbol is a bit. In the following, some embodiments are described with reference to the bit. It is to be understood that the aspects described with reference to the bit are applicable to other types of symbols. In the following, the watermark information may be also referred to as "watermark message" or "watermark code".

Usually, machine learning may roughly comprise three stages, namely training stage, test stage, and application stage (also known as inference stage). During the training stage, a given model can be trained using a large scale of training data, iteratively updating parameter values until the model can obtain consistent inference from the training data that meets the expected objective. Through the training, the model can be considered to learn the correlation between input and output (also known as input-to-output mapping) from the training data. The parameter values of the trained model are determined. In the test stage, test inputs are applied to the trained model to test whether the model can provide correct outputs, thereby determining the performance of the model. In the application stage, the model can be used to process actual inputs and determine corresponding outputs based on the parameter values obtained from training.

FIG. 1 illustrates a block diagram of an example environment 100 in which various embodiments of the present disclosure may be implemented. In the environment 100 of FIG. 1, two distinct phases of a model are showed, including a training phase 102 and an application phase 106. After the training phase 102 is completed, there may be a testing phase, which is not shown in FIG. 1.

In the training phase 102, a model training system 110 is configured to utilize a training dataset 112 to perform training of the machine learning model 105. At the beginning of training, the machine learning model 105 may have initial parameter values. The training process is to update the parameter values of the machine learning model 105 to the expected values based on the training data. In some embodiments, the machine learning model 105 is configured to generate a watermarked text.

In the application phase 106, the machine learning model 105 having trained parameter values may be provided to a model application system 130 for use. In the application phase 106, the machine learning model 105 may be used to process a target input 132 and provide a corresponding target output 134.

In FIG. 1, the model training system 110 and the model application system 130 may be implemented at any computing system with computing capability, such as various computing devices/systems, terminal devices, servers, etc. Terminal devices may include any type of mobile terminals, fixed terminals, or portable terminals, including mobile phones, desktop computers, laptops, netbooks, tablets, media computers, multimedia tablets, or any combination of the aforementioned, including accessories and peripherals of these devices or any combination thereof. Servers include but are not limited to mainframe, edge computing nodes, computing devices in cloud environment, etc.

It should be understood that the structure and function of each element in the environment 100 is described for illustrative purposes only and does not imply any limitations on the scope of the present disclosure. In an example, although shown as separate, the model training system 110 and the model application system 130 may be integrated into a same system or device. The implementation method disclosed herein is not limited in this regard.

As mentioned, the text watermark aims to encode some imperceptible signal into a piece of text so that the signal may be decoded from the text. The text watermark may be useful in various applications such as copyright protection and hidden message communication. With the development of LMs, such as the large language model (LLM), there is a growing need to track misinformation spread by LMs using text watermark injected to model outputs.

In the present disclosure, injecting a multi-bit watermark message into a piece of text with a paraphraser as the encoder is focused. The watermarked text keeps the semantic meaning of the original text, while another paired decoder will be used to decode the message from the water-marked text. Unlike lexical-based watermarks which inject watermarks by synonym substitutions, the paraphrasing-based method has a larger action space for watermark injection and also is more robust under perturbations. However, there are also challenges in designing paraphrasing-based watermarks, as it is unclear on how to properly inject imperceptible but detectable watermark signals while keeping the text quality and original semantic meaning. It is to be understood that the original text to be watermarked may be of any type and may have any suitable source, not limited to an output of an LM.

To address at least some of the above issues, embodiments of the present disclosure propose an improved solution for watermark processing. In this solution, at least one portion of an original text for watermark embedding is divided into a plurality of original text segments. For an original text segment of the plurality of original text segments, a target symbol is determined from a symbol sequence in watermark information. The plurality of original text segments is converted into a plurality of watermarked text segments, based on respective target symbols determined for the plurality of original text segments, by using a set of language models for watermark embedding. The set of language models corresponds to a set of symbol values respectively. Then, a watermarked text is generated for the original text based on the plurality of watermarked text segments.

With these embodiments of the present disclosure, the set of language models for watermark embedding corresponding to a set of symbol values respectively is applied for converting the first text segments into the second text segments. In this way, different language models may generate diverse text segment variants, and this diversity makes the embedded watermark more difficult to be intuitively identified, enhancing the stealthiness of the watermark. It becomes harder for attackers to predict and imitate the watermark patterns generated by different models, which increases the security of the watermark.

The goal of the present disclosure is to inject a multi-bit watermark message into a piece of text by paraphrasing. In addition, the vary-length watermark is focused, where the length of the watermark message is dependent on the length of the text. The longer the text is, the more information can be encoded in the watermarked text. This is contrary to the fix-length text watermark, where the watermark code is a fixed length for any given input text.

In the watermark injection stage, given an original text $x^0$ and a watermark message $M \in \{0,1\}^{\infty}$, a watermark is injected by generating a new watermarked text with an encoder $x^w = \in(x^0, M)$. In the watermark detection stage, a watermark decoder is used to decode the injected watermark $M' = D(x^w)$. The decoded bits are expected to match the prefix of the designed watermark message $M' = M[:len(M')]$. The methods to compute $N(x^0)$ depend on different watermark designs which will be described herein later.

There are some requirements on paraphrased text regarding fidelity, accuracy, robustness and stealthiness. For fidelity, the watermarked text should not change the meaning of the original text. The similarity sim $(x^0, x^w)$ should be high. For accuracy, the watermark decoder should accurately decode the watermark message. The error rate $|M' - M[:len(M')]|_0$ should be low. For robustness, the watermark message should still exist after the watermarked text undergoes some perturbation. Let $$M'_{pert} = D(pert(x^w))$$

denote decoded message from perturbed watermarked text. It is expected that the error rate after perturbation $$\left|M'_{pert} - \bar{M}\left[:len\left(M'_{pert}\right)\right]\right|_0$$

should be low. For stealthiness, the watermark should not be easily detected by human eyes. It may be evaluated with the criteria that human cannot easily detect the watermarks in the text. Let $$M'_h = D_{human}(x^w)$$

be the human guess on the watermark code. It is expected that $$|M'_h - M[:len(M'_h)]|_0$$

In order to better describe embodiments of the present disclosure, some concepts about proximal policy optimization (PPO) may be introduced firstly. PPO is a standard way to optimize a language model towards a high reward calculated by some pre-defined reward functions $r(x) \in \mathbb{R}$, where x is the input text (that is, a sequence of tokens). Let $\pi(x_t|x_{<t})$ denote the probability of generating token $x_t$ given the context, and $\pi(\cdot|x_{<t})$ denote the overall probability vector. $\pi_\theta$ is used to denote the model to train and $\pi_{ref}$ is used to denote a reference model. An "advantage" at each step $A_t(x)$ will be first estimated given the final reward, which approximates how each token contributes to the final reward. There are different choices of how to estimate the advantage. The generalized advantage estimation (GAE) with critic models may be used for estimation. Having the advantage $A_t(x)$ at each step, the PPO algorithm will optimize the input x by minimizing the following loss:

$$\ell_{PPO}(\theta; x) = \sum_t \left( -\mathbb{E}_t \left[ \frac{\pi_\theta(x_t \mid x_{<t})}{\pi_{ref}(x_t \mid x_{<t})} A_t(x) \right] + \lambda_k KL(\pi_\theta(\cdot \mid x_{<t}), \pi_{ref}(\cdot \mid x_{<t})) \right) \quad (1)$$

where the first term is to maximize the expected advantage on each token, and the second term is to regularize the model to not drastically change from the reference model.

With embodiments of the present disclosure, the watermark may be injected into a piece of text by paraphrasing the text to include the imperceptible watermark signal, which can be later decoded by a text classifier. In order to inject multi-bit information, a text segmentor that divides the text into multiple partitions is adopted, where each partition will carry one bit of the watermark information. To encode a watermark message into a piece of text, an LM-based paraphraser conditioned on a watermark bit is applied. The watermark bit is initialized as the first bit of the watermark message, and may be updated to the next bit during the token-by-token generation process whenever the segmentor determines that the current text is a separate partition. To decode the watermark message from a piece of watermarked text, the segmentor is used to generate multiple partitions of the text. Then, for each partition, the classifier may be used to determine the watermark bit. The concatenated message is the decoded watermark message.

Example embodiments of the present disclosure will be described with reference to the drawings. According to the embodiments of the present disclosure, a paraphrasing-based watermark by simultaneously fine-tuning an LLM-based paraphraser as the encoder and training an LLM-based text classifier as the decoder is proposed.

Figure 2:
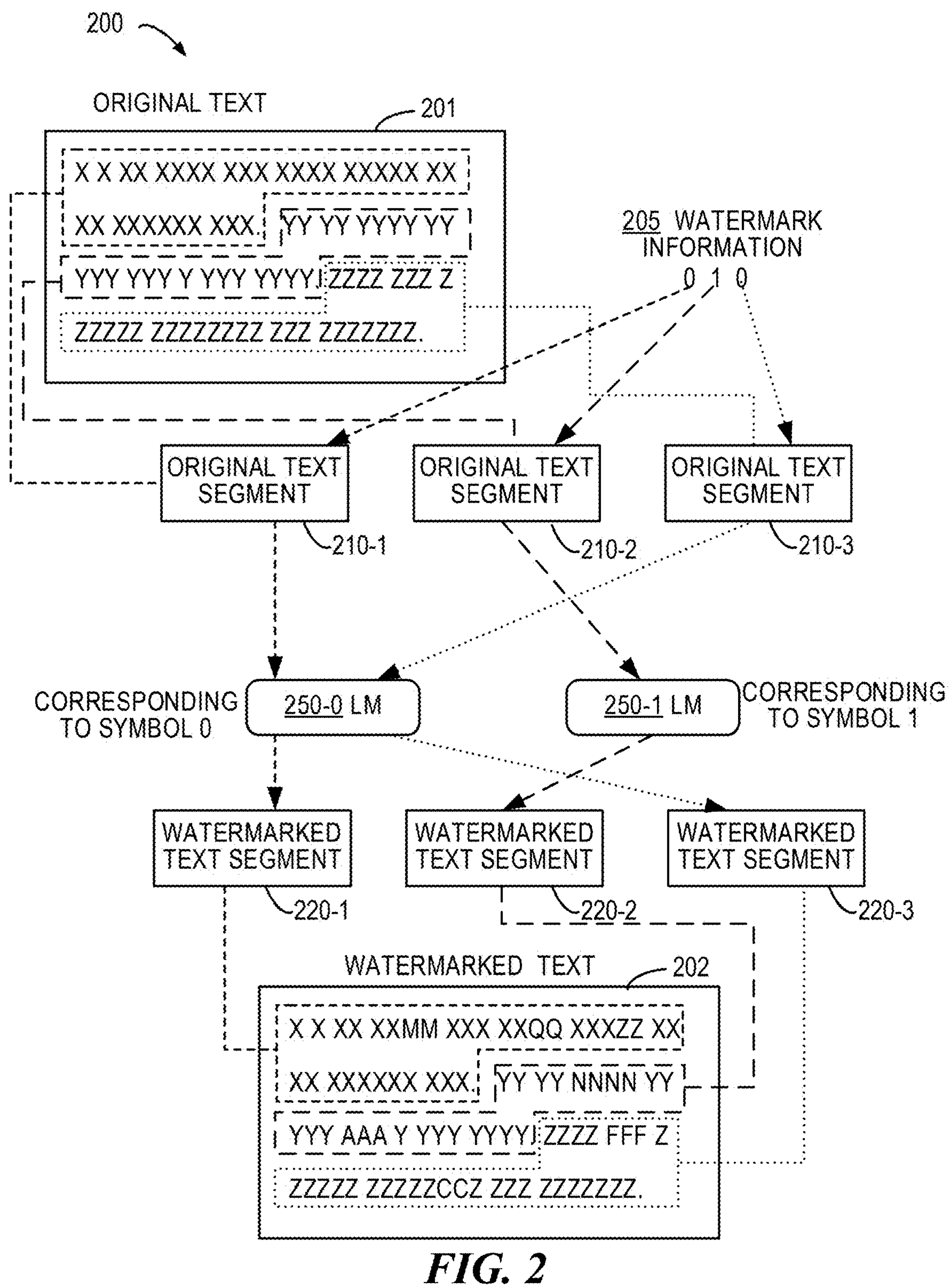
FIG. 2 illustrates a schematic diagram of an encoding process for watermark processing in accordance with some embodiments of the present disclosure.

FIG. 2 illustrates a schematic diagram of an encoding process 200 for watermark processing in accordance with some embodiments of the present disclosure. The encoding process 220 may be considered as an example process for watermark embedding. As shown in FIG. 2, at least one portion of an original text 201 for watermark embedding is divided into a plurality of original text segments 210-1 to 210-3. The original text 201 may be any text to be watermarked, for example, a text generated by an LM, a text written by a user, etc. For ease of illustration, the plurality of original text segments 210-1 to 210-3 may be referred to as a plurality of original text segments 210 individually, or collectively. For example, the original text may be divided based on sentences, paragraphs, or a predetermined number of words. In some embodiments, the entire original text 201 may be segmented and embedded with the watermark information. Alternatively, in some embodiments, a portion of the original text 201 may be segmented and embedded with the watermark information. Protection scope is not limited in this regard.

In some embodiments, a text element of a predetermined type may be detected in the at least one portion of the original text 201. Then, an original text segment of the plurality of original text segment 210 may be determined based on at least one detected text element of the predetermined type. In some embodiments, the text element of the predetermined type comprises a full stop. For example, the original text segment can be determined as a sentence in response to detecting a full stop. In this way, the segmentation of the at least one portion of the first text into sentences (that is, a sentence-level segmentation) makes the division simple and intuitive.

In an example, a text segmented S may be used to divide the original text 201 into the plurality of original text segments 210. During the encoding process 200, the text segmentor S may take the current generated text and output a boolean value $\mathcal{S}(x|\text{mode}=E)\varepsilon\{0,1\}$ to determine whether the next token will belong to a new segmentation. In some examples, the segmentation may be performed on the sentence-level and the context information may be kept. With these embodiments, performing sentence-level segmentation is robust, as word-level injection or deletion will not change the segmentation, and paraphrasing will also keep the sentence order in most cases. In this way, keeping the context provides more information for the decoder to extract the watermark code.

After the plurality of original text segments 210 are generated, for an original text segment (e.g., any of the original text segments 210-1 to 210-3) of the plurality of original text segments 210, a target symbol is determined from a symbol sequence in watermark information 205.

In some embodiments, the symbol sequence may comprise a bit string. The target symbol may be a bit (for example, 0 or 1) in a key (also referred to as the symbol sequence). The key may be input by a user, or determined by the encoder, for example, assigned by a watermarker. The bit may indicate which paraphraser of the encoder is to be used for paraphrasing the original text segment. For example, bit 0 indicates that a first paraphraser is to be applied for paraphrase, while bit 1 indicates a second paraphraser that is to be applied for paraphrase.

Then, the plurality of original text segments 210 are converted into a plurality of watermarked text segments 220 (e.g., including watermarked text segments 220-1 to 220-3), based on respective target symbols determined for the plurality of original text segments, by using a set of language models 250 (e.g., LM 250-0 and LM 250-1) for watermark embedding. In some embodiments, the language model 250 may be a large language model (LLM). The set of language models corresponds to a set of symbol values respectively.

For example, in case of three symbol values, three LMs may be employed with each corresponding to a symbol value of the three symbol values.

In some embodiments, the set of language models comprises a first language model (e.g., LM 250-0) corresponding to a bit of 0 and a second language model (e.g., LM 250-1) corresponding to a bit of 1. For example, it is assumed that the symbol sequence is 010, then the application sequence of the language models will be the first language model, the second language model, and then the first language model.

The process of converting the plurality of original text segments 210 into the plurality of watermarked text segments 220 may be summarized in algorithm 1. FIG. 3 illustrates a *schematic* diagram of the algorithm 1 for encoding in accordance with some embodiments of the present disclosure. As shown in FIG. 3, an encoder aims to paraphrase the input text $x^0$ based on a given watermark code and get $x^w=E(x^0, M)$ based on the set of language models 250. The encoder may have two LM-based paraphrasers ($\theta_0$, $\theta_1$) and they are used alternatively in the token-by-token generation process, which is based on the current watermark code determined by the sentence segmentor. For example, let $$x_t^w = f(x^o, x_{\leq t}^w; \theta_i)$$

denote the process of generating the next token when paraphrasing the input $x^0$ parametrized by $\theta_i$. At code segment 305, the current watermark bit is tracked. At code segment 310, the next token is generated with the corresponding paraphraser $\theta_{bit}$. After each generation step, at code segment 315, whether the next token will be a new segmentation is checked by calculating $\mathcal{S}(x^w; \text{mode=E})$, and bit is updated accordingly.

In some embodiments, for an original text segment of the plurality of original text segments, a target language model corresponding to a symbol value of the target symbol determined for the original text segment may be selected from the set of language models. Then, the original text segment may be converted into a watermarked text segment by using the target language model. Taking the original text segment being original text segment 210-1 as an example, the symbol value of the target symbol determined for the original text segment 210-1 is 0, the target language model may be selected as the LM 250-0 which corresponding to symbol 0. Then, the LM 250-0 may be used to convert the original text segment 210-1 into a watermarked text 220-1.

After the plurality of watermarked text segments are generated, a watermarked text 202 for the original text is generated based on the plurality of watermarked text segments 210. For example, the watermarked text 202 is formed by the plurality of watermarked text segments 210.

In some embodiments, the at least one portion of the original text may be divided according to a segmentation strategy. The segmentation strategy may indicate how the original text is segmented. For example, the segmentation strategy may indicate that the original text will be divided into sentences, which means each original text segment includes a sentence. For example, the segmentation strategy may indicate that the original text will be divided into paragraphs, which means each original text segment includes a paragraph. In another example, the segmentation strategy may indicate that the original text will be divided into segments with a predetermined number of words, which means each original text segment includes the predetermined number of words. The segmentation strategy may indicate the original text to be divided in any way, which is not limited in the present disclosure. The segmentor described above may be implemented based on the segmentation strategy.

The following will describe a decoding process for watermark processing (which is also referred to as watermark extraction) with reference to FIG. 4. FIG. 4 illustrates a decoding process for watermark processing in accordance with some embodiments of the present disclosure. As shown in FIG. 4, the plurality of watermarked text segments 220 may be extracted from the watermarked text 202 according to the segmentation strategy. The text segmentor S may be used to extract the plurality of watermarked text segments 220 from the watermarked text 202. During the decoding process, the text segmentor S may take a piece of text x as input and output a list of $S(x|\text{mode=D})=[\tilde{x}_1, \tilde{x}_2, \ldots]$.

In some embodiments, respective predicted symbols 460 (e.g., including predicted symbols 460-1 to 460-3) for the plurality of watermarked text segments may be determined by using a classification model 450 corresponding to the set of symbol values. Then, the watermark information (e.g., recovered watermark 405) may be determined based on the respective predicted symbols.

The process of determining the respective predicted symbols 460 may be in algorithm 2. FIG. 5 illustrates a schematic diagram of the algorithm 2 for decoding in accordance with some embodiments of the present disclosure. As shown in FIG. 5, a decoder D may decode the watermark code from a piece of text and get $M'=D(x^w)\in\{0,1\}^*$. $g(x; \theta_d)\in\{0,1\}$ may be used to denote a binary classifier (e.g., the classification model 450) on a text with parameters $\theta_d$, and $g_p(x; \theta_d)\in\{0,1\}$ may be used to denote the predicted probability of class-1. At code segment 505, the input text may be segmented into multiple partitions $\mathcal{S}(x; \text{mode=D})$. At code segment 510, the classifier may be applied to each partition to calculate the decoded watermark.

In some embodiments, the method may be performed during training of the set of language models 250. Reward information may be determined at least based on the respective target symbols and the respective predicted symbols. The classification model 450 may be viewed as a "reward model" to train the set of language models 250 with PPO. The set of language models 250 and the classification model 450 may be trained alternatively. In the present disclosure, it is alternated between two goals: optimizing the decoder (as an example of the classification model 450, denoted as $\theta_d$) and optimizing the paraphrasers (as an example of the set of language models 250, denoted as $\theta_0$ and $\theta_1$). The goal of the decoder is to accurately decode the original watermark code M (e.g., respective target symbols). The cross entropy loss is used to optimize the decoder as follows:

$$\ell_D(\theta_d; x^w, M) = \sum_{i=1}^{len(D(x^w))} (M[i] \cdot g_s(\tilde{x}_i^w; \theta_d) + (1 - M[i]) \cdot (1 - g_s(\tilde{x}_i^w; \theta_d))). \tag{2}$$

In some embodiments, the set of language models 250 may be fine-tuned so that the generated text of the encoder may be better classified by the decoder (e.g., the classification model 450). The decoder may be trained with standard classification loss so that it can better classify between "bit-0 texts" and "bit-1 texts", with the ground truth watermarked bits and the corresponding watermark text generated by the encoder. The decoder may be used as a reward model to evaluate how well the paraphrased text generated by the set of language models 250 can be correctly classified. Therefore, PPO-based reinforcement learning techniques may be used to finetune the set of language models 250 so that the injected watermark may be better decoded. A co-training framework may be used so that the encoder (e.g., language model) and decoder are alternatively updated during the training process.

The goal of the set of language models 250 is to generate inputs that can be better recognized by the decoder, while keeping its normal utility (for example, a good paraphrasing performance). To optimize the set of language models 250, the set of language models 250 may be fine-tuned with RL-based techniques with respect to a reward model is utilized. Here, the decoder is used to calculate the "reward" of how the output (e.g., the respective predicted symbols) of the set of language models 250 can be successfully decoded as the original watermark code (e.g., respective target symbols). For example, given original text $x^0$, watermark code M and the watermarked text $x^w = E(x^0, M)$, the watermark reward $r_w$ is calculated by:

$$r_w(x^w, M) = \sum_{i=1}^{len(D(x^w))} \mathbb{1}\{D(x^w)[i] = M[i]\} \quad (3)$$

where $r_w(x^w, M)$ represents the reward information determined at least based on the respective target symbols and the respective predicted symbols.

In some embodiments, the original text may be converted into a third text by using a reference language model. A similarity degree between the watermarked text and the third text may be determined. Then, the reward information may be determined further based on the similarity degree. In some examples, a similarity reward (also referred to as the similarity degree) $r_s(x^w, x^0)$ between the watermarked text and the third text may be calculated. The reward information may be calculated as a weighted sum of the two rewards:

$$r(x^w, x^o, M) = \lambda_w \cdot r_w(x^w, M) + \lambda_s \cdot r_s(x^w, x^o) \quad (4)$$

After the reward information is determined, a loss function for the set of language models 250 may be determined based on the reward information and the set of language models 250 may be updated based on the loss function. With the reward information, the PPO algorithm will be used to update the parameters $(\theta_0, \theta_1)$. One change in the PPO loss proposed by the present disclosure is that the $x^w$ is generated by two language models $\theta_0$ and $\theta_1$, so each model only needs to update on the inputs that are generated by each model. The formal PPO loss for the set of language models 250, assuming $A_t(x_w, x_0, M)$ (which we will abbreviate as $A_t$ without ambiguity) has been calculated, is as follows:

$$\ell_E(\theta_0, \theta_1) = \sum_t \mathbb{1}\{x_t \text{ is generated by } \theta_0\} \cdot \left(-\mathbb{E}_t\left[\frac{\pi_{\theta_0}(x_t \mid x_{<t})}{\pi_{ref}(x_t \mid x_{<t})} A_t\right] + \lambda_k KL(\pi_{\theta_0}(\cdot \mid x_{<t}), \pi_{ref}(\cdot \mid x_{<t}))\right) + \sum_t \mathbb{1}\{x_t \text{ is gererated by } \theta_1\} \cdot \quad (5)$$

-continued $$\left(-\mathbb{E}_t\left[\frac{\pi_{\theta_1}(x_t \mid X_{<t})}{\pi_{ref}(x_t \mid X_{<t})} A_t\right] + \lambda_k KL(\pi_{\theta_1}(\cdot \mid x_{<t}), \pi_{ref}(\cdot \mid x_{<t}))\right)$$

where the information of whether $x_t$ is generated by $\theta_0$ or $\theta_1$ is recorded during the generation stage.

The process of training the set of language models 250 may be summarized in algorithm 3. FIG. 6 illustrates a schematic diagram of the algorithm 3 for training the set of language models 250 in accordance with some embodiments of the present disclosure. As shown in FIG. 6, at code segment 605, a dataset consisting of original texts $x_0$, may be used. At code segment 610, a watermark key M will be randomly sampled. At code segment 615, the watermarked text $x_w$ may be calculated with the current encoder $(\theta_0, \theta_1)$ and the advantage function with the current decoder $\theta_d$. At code segment 620, the encoder and decoder with the respective losses are updated.

In some embodiments, before the training, the set of language models may be initialized over a dataset and a sample in the dataset comprises a reference text and a rewritten text having consistent sematic with the reference text. it is observed that the training performance heavily depends on the model initialization. This is expected, as the classification model 450 and the set of language models 250 rely on each other to do the update and therefore requires a good initialization. The update of $(\theta_0, \theta_1)$ needs the reward provided by $\theta_d$, and the update of $\theta_d$ needs the samples generated by $(\theta_0, \theta_1)$. The set of language models may be initialized with supervised finetuning (SFT) loss on a paraphrasing dataset $$\mathcal{D}_{SFT} = \{(x_o^{SFT}, x_{para}^{SFT})\},$$

where $\mathcal{D}_{SFT}$ represents the dataset, $$x_o^{SFT}$$

represents the reference text, and $$x_{para}^{SFT}$$

represents the rewritten text.

In some embodiments, the set of language models 250 may be initialized based on differences between the rewritten text and respective third texts generated by converting the reference text using the set of language models, and a difference between the respective third texts. The set of language models 250 (denoted as $\theta_0$ and $\theta_1$) may be simultaneously finetuned and they are expected to have a small loss, but they also have a difference in their behavior (measured by JS divergence), with the loss as follows:

$$\ell_{Einit}(\theta_0, \theta_1; x_o^{SFT}, x_{para}^{SFT}) = \ell_{SFT}(\theta_0, x_o^{SFT}, x_{para}^{SFT}) + \ell_{SFT}(\theta_1; x_o^{SFT}, x_{para}^{SFT}) - \lambda_{JS} \cdot JS(\pi_{\theta_0}(x_{para}^{SFT} \mid x_o^{SFT}), \pi_{\theta_1}(x_{para}^{SFT} \mid x_o^{SFT})) \quad (6)$$

where $$\ell_{SFT}(\theta_0; x_o^{SFT}, x_{para}^{SFT})$$

represents the difference between the rewritten text and respective third texts generated by converting the reference text using language model $\theta_0$, $$\ell_{SFT}(\theta_1; x_o^{SFT}, x_{para}^{SFT})$$

represents the difference between the rewritten text and respective third texts generated by converting the reference text using language model $\theta_1$ and $$JS(\pi_{\theta_o}(x_{para}^{SFT} \mid x_o^{SFT}), \pi_{\theta_1}(x_{para}^{SFT} \mid x_o^{SFT}))$$

represents the difference between the respective third texts. In this way, by initializing the model over various texts that express the consistent sematic, the language model may learn multiple ways to express the same information, thereby enhancing its generalization capabilities.

Figures 7, 8:
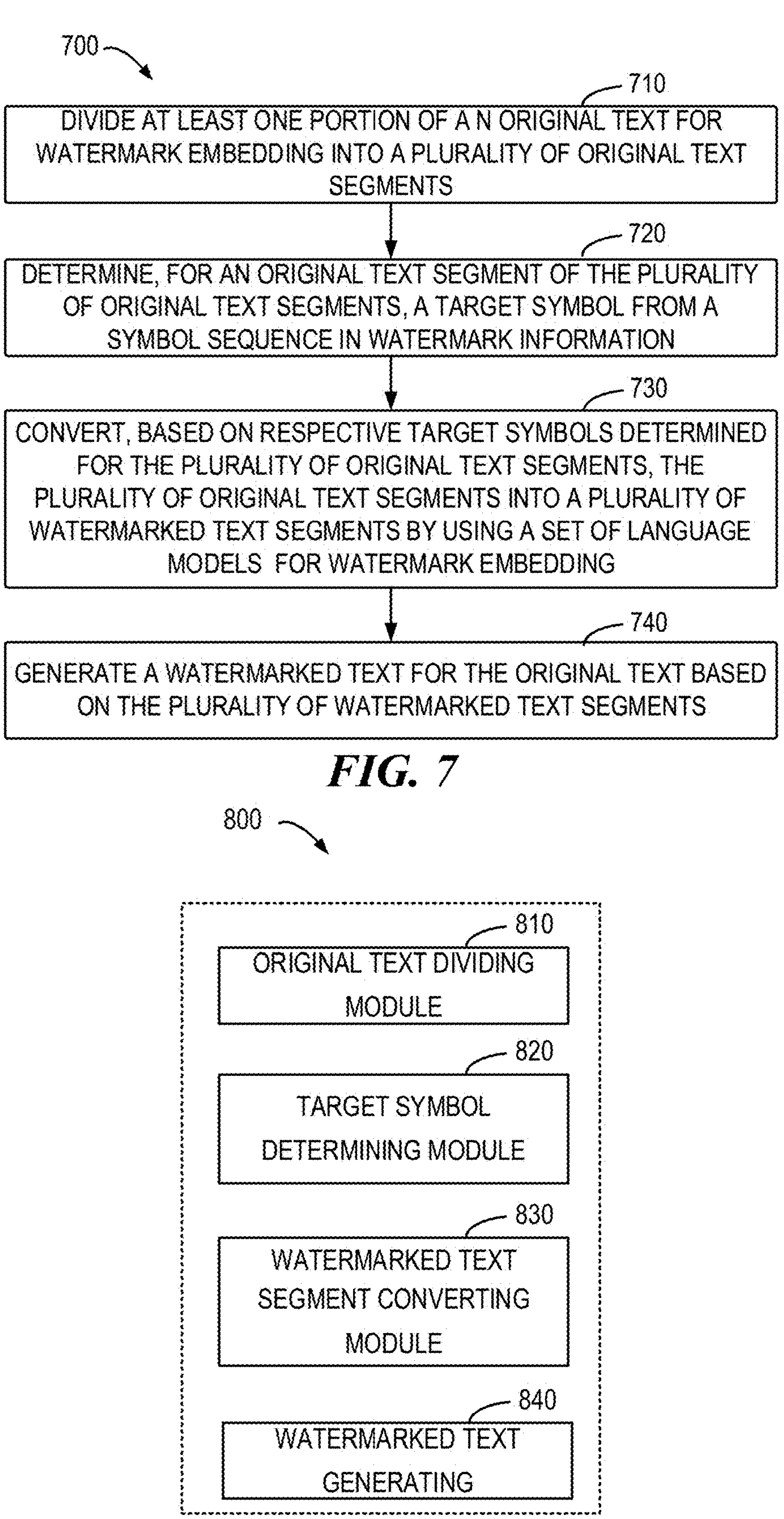
FIG. 7 illustrates a flowchart of a process for watermark processing in accordance with some embodiments of the present disclosure.
FIG. 8 shows a block diagram of an apparatus for watermark processing in accordance with some embodiments of the present disclosure.

FIG. 7 illustrates a flowchart of a process 700 for watermark processing in accordance with some embodiments of the present disclosure. The process 700 may be implemented at the model training system 110 or the model application system 130 of FIG. 1.

At block 710, the model training system 110 or the model application system 130 divide at least one portion of a n original text for watermark embedding into a plurality of original text segments.

At block 720, the model training system 110 or the model application system 130 determines, for an original text segment of the plurality of original text segments, a target symbol from a symbol sequence in watermark information.

At block 730, the model training system 110 or the model application system 130 converts, based on respective target symbols determined for the plurality of original text segments, the plurality of original text segments into a plurality of watermarked text segments by using a set of language models for watermark embedding, the set of language models corresponding to a set of symbol values respectively.

At block 740, the model training system 110 or the model application system 130 generates a watermarked text for the original text based on the plurality of watermarked text segments.

In some embodiments, converting the plurality of original text segments into the plurality of watermarked text segments comprises: for an original text segment of the plurality of original text segments, selecting, from the set of language models, a target language model corresponding to a symbol value of the target symbol determined for the original text segment; and converting the original text segment into a watermarked text segment by using the target language model.

In some embodiments, the at least one portion of the original text is divided according to a segmentation strategy, and the method further comprises: extracting, from the watermarked text, the plurality of watermarked text segments according to the segmentation strategy; determining respective predicted symbols for the plurality of watermarked text segments by using a classification model corresponding to the set of symbol values; and determining the watermark information based on the respective predicted symbols.

In some embodiments, the method is performed during training of the set of language models, and the process 700 further comprises: determining reward information at least based on the respective target symbols and the respective predicted symbols; determining a loss function for the set of language models based on the reward information; and updating the set of language models based on the loss function.

In some embodiments, the process 700 further comprises converting the original text into a third text by using a reference language model; and determining a similarity degree between the watermarked text and the third text, and the reward information is determined further based on the similarity degree.

In some embodiments, before the training, the set of language models are initialized over a dataset and a sample in the dataset comprises a reference text and a rewritten text having consistent sematic with the reference text.

In some embodiments, the set of language models are initialized based on: differences between the rewritten text and respective third texts generated by converting the reference text using the set of language models; and a difference between the respective third texts.

In some embodiments, dividing at least the portion of the original text for watermark embedding into the plurality of original text segments comprises: detecting a text element of a predetermined type in the at least one portion of the original text; and determining an original text segment of the plurality of original text segment based on at least one detected text element of the predetermined type.

In some embodiments, the text element of the predetermined type comprises a full stop.

In some embodiments, the symbol sequence comprises a bit string, and the set of language models comprises a first language model corresponding to a bit of 0 and a second language mode corresponding to a bit of 1.

FIG. 8 shows a block diagram of an apparatus 800 for watermark processing in accordance with some embodiments of the present disclosure. The apparatus 800 may be implemented, for example, or included at model training system 110 or the model application system 130 of FIG. 1. Various modules/components in the apparatus 500 may be implemented by hardware, software, firmware, or any combination thereof.

As shown, the apparatus 800 includes an original text dividing module 810 configured to divide at least one portion of an original text for watermark embedding into a plurality of original text segments.

The apparatus 800 further includes a target symbol determining module 820 configured to determine, for an original text segment of the plurality of original text segments, a target symbol from a symbol sequence in watermark information.

The apparatus 800 further includes a watermarked text segment converting module 830 configured to convert, based on respective target symbols determined for the plurality of original text segments, the plurality of original text segments into a plurality of watermarked text segments by using a set of language models for watermark embedding, the set of language models corresponding to a set of symbol values respectively.

The apparatus 800 further includes a watermarked text generating module 840 configured to generate a watermarked text for the original text based on the plurality of watermarked text segments.

The apparatus 800 may further comprise corresponding modules that are configured to perform the operations of the process 700 and other embodiments as described herein.

Figure 9:
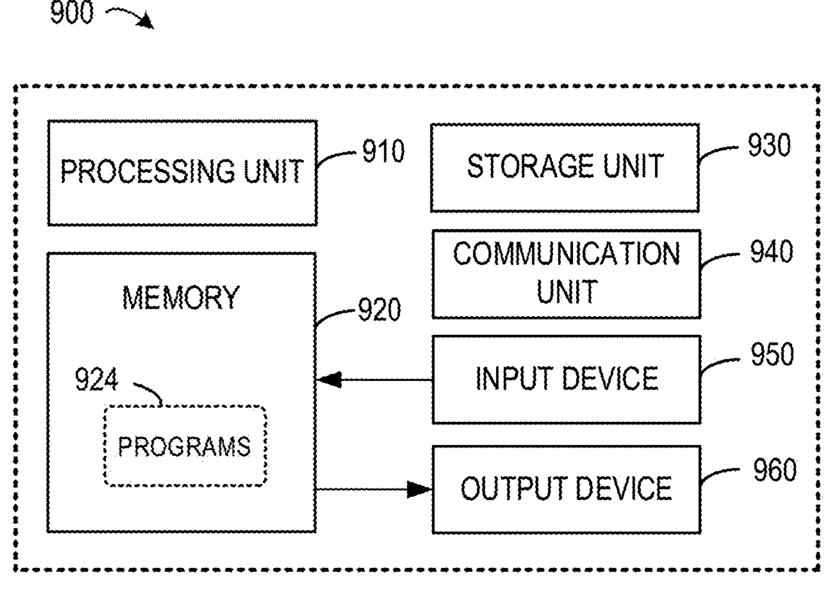
FIG. 9 illustrates a block diagram of an electronic device in which one or more embodiments of the present disclosure can be implemented

FIG. 9 illustrates a block diagram of an electronic device 900 in which one or more embodiments of the present disclosure can be implemented. It would be appreciated that the electronic device 900 shown in FIG. 9 is only an example and should not constitute any restriction on the function and scope of the embodiments described herein. The electronic device 900 may be used, for example, to implement the model training system 110 or the model application system 130 of FIG. 1. The electronic device 900 may also be used to implement the apparatus 800 of FIG. 11.

As shown in FIG. 9, the electronic device 900 is in the form of a general computing device. The components of the electronic device 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes according to the programs stored in the memory 920. In a multiprocessor system, multiple processing units execute computer executable instructions in parallel to improve the parallel processing capability of the electronic device 900.

The electronic device 900 typically includes a variety of computer storage medium. Such medium may be any available medium that is accessible to the electronic device 900, including but not limited to volatile and non-volatile medium, removable and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory) or any combination thereof. The storage device 930 may be any removable or non-removable medium, and may include a machine-readable medium, such as a flash drive, a disk, or any other medium, which can be used to store information and/or data (such as training data for training) and can be accessed within the electronic device 1200.

The electronic device 900 may further include additional removable/non-removable, volatile/non-volatile, transitory/non-transitory storage medium. Although not shown in FIG. 9, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 920 may include programs 924, which has one or more program modules configured to perform various methods or acts of various embodiments of the present disclosure.

The communication unit 940 communicates with a further computing device through the communication medium. In addition, functions of components in the electronic device 900 may be implemented by a single computing cluster or multiple computing machines, which can communicate through a communication connection. Therefore, the electronic device 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The electronic device 900 may also communicate with one or more external devices (not shown) through the communication unit 940 as required. The external device, such as a storage device, a display device, etc., communicate with one or more devices that enable users to interact with the electronic device 900, or communicate with any device (for example, a network card, a modem, etc.) that makes the electronic device 900 communicate with one or more other computing devices. Such communication may be executed via an input/output (I/O) interface (not shown).

According to example implementation of the present disclosure, a computer-readable storage medium is provided, on which a computer-executable instruction or computer program is stored, where the computer-executable instructions or the computer program is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the device, the equipment and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions includes a product, which includes instructions to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment or instructions, which contains one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is example, not exhaustive, and is not limited to the disclosed implementations. Without departing from the scope and spirit of the described implementations, many modifications and changes are obvious to ordinary skill in the art. The selection of terms used in this article aims to best explain the principles, practical application or improvement of technology in the market of each implementation, or to enable other ordinary skill in the art to understand the various embodiments disclosed herein.

What is claimed is:

1. A method of watermark processing, comprising:

dividing at least one portion of an original text for watermark embedding into a plurality of original text segments, wherein the at least one portion of the original text is divided according to a segmentation strategy;

determining, for an original text segment of the plurality of original text segments, a target symbol from a symbol sequence in watermark information;

converting, based on respective target symbols determined for the plurality of original text segments, the plurality of original text segments into a plurality of watermarked text segments by using a set of language models for watermark embedding, the set of language models corresponding to a set of symbol values respectively;

generating a watermarked text for the original text based on the plurality of watermarked text segments;

extracting, from the watermarked text, the plurality of watermarked text segments according to the segmentation strategy;

determining respective predicted symbols for the plurality of watermarked text segments by using a classification model corresponding to the set of symbol values; and determining the watermark information based on the respective predicted symbols.

2. The method of claim 1, wherein converting the plurality of original text segments into the plurality of watermarked text segments comprises:

for the original text segment of the plurality of original text segments, selecting, from the set of language models, a target language model corresponding to a symbol value of the target symbol determined for the original text segment; and converting the original text segment into a watermarked text segment by using the target language model.

3. The method of claim 1, wherein the method is performed during training of the set of language models, and the method further comprises:

determining reward information at least based on the respective target symbols and the respective predicted symbols;

determining a loss function for the set of language models based on the reward information; and updating the set of language models based on the loss function.

4. The method of claim 3, further comprising:

converting the original text into a third text by using a reference language model; and determining a similarity degree between the watermarked text and the third text, and the reward information is determined further based on the similarity degree.

5. The method of claim 3, wherein before the training, the set of language models are initialized over a dataset and a sample in the dataset comprises a reference text and a rewritten text having consistent sematic with the reference text.

6. The method of claim 5, wherein the set of language models are initialized based on:

differences between the rewritten text and respective third texts generated by converting the reference text using the set of language models; and a difference between the respective third texts.

7. The method of claim 1, wherein dividing the at least one portion of the original text for watermark embedding into the plurality of original text segments comprises:

detecting a text element of a predetermined type in the at least one portion of the original text; and determining an original text segment of the plurality of original text segment based on at least one detected text element of the predetermined type.

8. The method of claim 1, wherein the text element of the predetermined type comprises a full stop.

9. The method of claim 1, wherein the symbol sequence comprises a bit string, and the set of language models comprises a first language model corresponding to a bit of 0 and a second language mode corresponding to a bit of 1.

10. An electronic device, comprising a computer processor coupled to a computer-readable memory unit, the memory unit comprising instructions that when executed by the computer processor implements a method of watermark processing, the method comprising:

dividing at least one portion of an original text for watermark embedding into a plurality of original text segments, wherein the at least one portion of the original text is divided according to a segmentation strategy;

determining, for an original text segment of the plurality of original text segments, a target symbol from a symbol sequence in watermark information;

converting, based on respective target symbols determined for the plurality of original text segments, the plurality of original text segments into a plurality of watermarked text segments by using a set of language models for watermark embedding, the set of language models corresponding to a set of symbol values respectively;

generating a watermarked text for the original text based on the plurality of watermarked text segments;

extracting, from the watermarked text, the plurality of watermarked text segments according to the segmentation strategy;

determining respective predicted symbols for the plurality of watermarked text segments by using a classification model corresponding to the set of symbol values; and determining the watermark information based on the respective predicted symbols.

11. The electronic device of claim 10, wherein converting the plurality of original text segments into the plurality of watermarked text segments comprises:

for the original text segment of the plurality of original text segments, selecting, from the set of language models, a target language model corresponding to a symbol value of the target symbol determined for the original text segment; and converting the original text segment into a watermarked text segment by using the target language model.

12. The electronic device of claim 10, wherein the method is performed during training of the set of language models, and the method further comprises:

determining reward information at least based on the respective target symbols and the respective predicted symbols;

determining a loss function for the set of language models based on the reward information; and updating the set of language models based on the loss function.

13. The electronic device of claim 12, the method further comprising:

converting the original text into a third text by using a reference language model; and determining a similarity degree between the watermarked text and the third text, and the reward information is determined further based on the similarity degree.

14. The electronic device of claim 12, wherein before the training, the set of language models are initialized over a dataset and a sample in the dataset comprises a reference text and a rewritten text having consistent sematic with the reference text.

15. The electronic device of claim 14, wherein the set of language models are initialized based on:

differences between the rewritten text and respective third texts generated by converting the reference text using the set of language models; and a difference between the respective third texts.

16. The electronic device of claim 10, wherein dividing the at least one portion of the original text for watermark embedding into the plurality of original text segments comprises:

detecting a text element of a predetermined type in the at least one portion of the original text; and determining an original text segment of the plurality of original text segment based on at least one detected text element of the predetermined type.

17. The electronic device of claim 10, wherein the symbol sequence comprises a bit string, and the set of language models comprises a first language model corresponding to a bit of 0 and a second language mode corresponding to a bit of 1.

18. A computer program product, the computer program product comprising a non-transitory computer readable storage medium having program instructions embodied therewith, the program instructions executable by an electronic device to cause the electronic device to perform a method of watermark processing, the method comprising:

dividing at least one portion of an original text for watermark embedding into a plurality of original text segments, wherein the at least one portion of the original text is divided according to a segmentation strategy;

determining, for an original text segment of the plurality of original text segments, a target symbol from a symbol sequence in watermark information;

converting, based on respective target symbols determined for the plurality of original text segments, the plurality of original text segments into a plurality of watermarked text segments by using a set of language models for watermark embedding, the set of language models corresponding to a set of symbol values respectively;

generating a watermarked text for the original text based on the plurality of watermarked text segments extracting, from the watermarked text, the plurality of watermarked text segments according to the segmentation strategy;

determining respective predicted symbols for the plurality of watermarked text segments by using a classification model corresponding to the set of symbol values; and determining the watermark information based on the respective predicted symbols.

* * * * *